J. E. SPRAKER.
EXTENSION TABLE.

No. 189,810. Patented April 17, 1877.

Witnesses.
Otto Hufeland
Hugo Brueggemann

Inventor.
James E Spraker
by
Van Santvoord & Hauff
his attorney

UNITED STATES PATENT OFFICE.

JAMES E. SPRAKER, OF HOMER, ILLINOIS.

IMPROVEMENT IN EXTENSION-TABLES.

Specification forming part of Letters Patent No. 189,810, dated April 17, 1877; application filed March 1, 1877.

*To all whom it may concern:*

Be it known that I, JAMES E. SPRAKER, of Homer, in the county of Champaign and State of Illinois, have invented a new and useful Improvement in Slides for Extension-Tables, which improvement is fully set forth in the following specification, reference being had to the accompanying drawing, in which—

Figure 1:
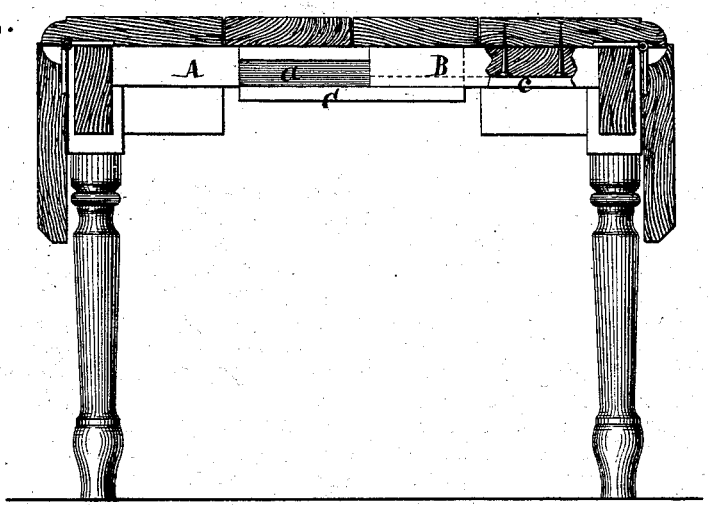
Figure 2:
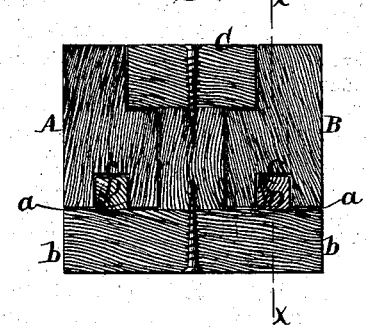
Figure 3:
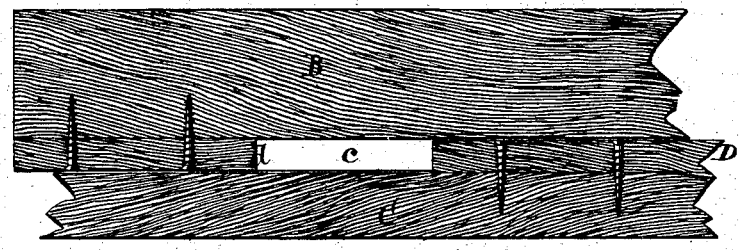

Figure 1 represents a vertical cross-section of an extension-table containing my improvement. Fig. 2 is a vertical cross-section of the slides detached. Fig. 3 is a longitudinal vertical section thereof in the plane $x\ x$, Fig. 2.

Similar letters indicate corresponding parts.

My improvement relates to slides for extension-tables; and consists in two L-shaped end slides combined with a central supporting-slide, which is provided with longitudinal grooves in its opposite sides, to receive the L-shaped end slides, the lower parts of such longitudinal grooves being extended, so as to form a bearing for the whole area of the end slides, and thereby the slides are caused to work with great ease and facility. With the central supporting-slide are combined stops in the form of longitudinal rails, while the two end slides are provided with grooves to receive the said stops or rails, and which grooves are closed at one end, so as to form counter-stops; and thus the stops, besides serving to regulate the extent of motion of the slides, assist in guiding them on each other.

In the drawing, the letters A B C designate three slides, which are constructed and arranged according to my invention. The two slides A B are of an L shape in cross-section, and they are, respectively, secured to the two end or movable parts of a table, as shown in Fig. 1, while they are placed on opposite sides of the slide C, which is provided with longitudinal grooves $a\ a$ to receive them. The lower sides of the grooves $a\ a$ are extended out laterally, so that the edges thereof are flush with the outer edges of the end slides A B, as shown at $b\ b$, Fig. 2, and thus a bearing or support is formed for the whole area of the end slides A B, as clearly shown in Fig. 2. The advantage obtained in extending the lower sides of the grooves $a\ a$ is, that the end slides A B are thus not allowed to sink or hang down sidewise and become caught by too great friction; or, in other words, the advantage is, that the end slides A B are caused to work with the greatest possible ease and facility.

The central slide C is detached from the table, and simply serves to support and connect the end slides A B, as well as to support the supplemental or middle leaves of the table.

To the central slide C are secured two rails, D D, which are fitted in grooves $c\ c$, formed in the end slides A B. These grooves $c\ c$ are closed at one end by inserting therein a block, $d$, so as to form counter-stops. The stops D D are placed at or near the opposite ends of the central rail C, and the grooves $c\ c$ are closed at their ends opposite to said stops D D, so that when the end slides A B are moved away from the central slide C, the ends of the grooves $c\ c$ come in contact with the stops D D. I am thus enabled to regulate the extent of motion of the end slides, while, at the same time, by the grooves $c\ c$ and rails D D, the slides are guided on each other.

The central slide C is preferably made in three pieces, as shown in Fig. 2, and of ash or other hard wood, while the end slides A B are made in one piece and of like material.

My improved slides are especially applicable to common breakfast-tables and small extension-tables, and they can be made and applied by any ordinary mechanic.

What I claim as new, and desire to secure by Letters Patent, is—

1. The combination of the L-shaped end slides A B and the central supporting-slide C, having grooves $a\ a$ to receive the said end slides, and the lower sides of which are extended, substantially as and for the purpose described.

2. The combination of stops or rails D D and grooves $c\ c$, having counter-stops $d$, with L-shaped end slides A B and the central supporting-slide C, substantially as and for the purpose described.

In testimony that I claim the foregoing I have hereunto set my hand and seal this 23d day of February, 1877.

JAMES E. SPRAKER. [L. S.]

Witnesses:
 JAS. W. MCWILLIAMS,
 JOHN W. REED.